United States Patent
Bian et al.

(10) Patent No.: US 12,029,363 B2
(45) Date of Patent: Jul. 9, 2024

(54) CLEANING HEAD FOR A FLOOR CLEANING EQUIPMENT

(71) Applicant: SEB S.A., Ecully (FR)

(72) Inventors: Zhuang Bian, Jiangsu (CN); Pierre-Louis Bodin, Vernon (FR)

(73) Assignee: SEB S.A. (FR)

(*) Notice: Subject to any disclaimer, the term of this patent is extended or adjusted under 35 U.S.C. 154(b) by 198 days.

(21) Appl. No.: 17/618,049

(22) PCT Filed: Dec. 20, 2019

(86) PCT No.: PCT/EP2019/086593
§ 371 (c)(1),
(2) Date: Dec. 10, 2021

(87) PCT Pub. No.: WO2020/249249
PCT Pub. Date: Dec. 17, 2020

(65) Prior Publication Data
US 2022/0304541 A1    Sep. 29, 2022

(30) Foreign Application Priority Data

Jun. 12, 2019 (CN) .......................... 201910504309.7
Jun. 12, 2019 (CN) .......................... 201920874700.1

(51) Int. Cl.
*A47L 13/22* (2006.01)
*A47L 13/42* (2006.01)

(52) U.S. Cl.
CPC ............... *A47L 13/22* (2013.01); *A47L 13/42* (2013.01)

(58) Field of Classification Search
CPC ........ A47L 11/30; A47L 11/34; A47L 11/201; A47L 11/408; A47L 11/4083;
(Continued)

(56) References Cited

U.S. PATENT DOCUMENTS 4,971,471 A * 11/1990 Sloan ..................... A47L 13/312
                                                                15/228
2003/0051308 A1 * 3/2003 Morgan ..................... A47L 5/34
                                                                15/373
(Continued)

FOREIGN PATENT DOCUMENTS

CN     207613721 U  *  7/2018
CN     108852185 A     11/2018
(Continued)

OTHER PUBLICATIONS

DE-102016103943-A1 WIPO Translation; Wet Cleaning Device with a Pump for Conveying Liquid from a Liquid Tank to a Cleaning Element; Sep. 7, 2017 (Year: 2017).*
(Continued)

*Primary Examiner* — Laura C Guidotti
*Assistant Examiner* — Sidney D Full
(74) *Attorney, Agent, or Firm* — Lerner David LLP (57) ABSTRACT

A floor cleaning head body includes: a cleaning head body having at least one suction port at the bottom; a base plate; a water supply tank mounted to the cleaning head body and located above the base plate; a water distributor mounted to the base plate; and a communicating tube. The water supply tank includes a venting hole in communication with the exterior. A first chamber is provided inside the water supply tank, and a water outlet is provided at the bottom of the water supply tank. The water distributor includes a housing, a water inlet provided at the top of the housing, a second chamber formed inside the housing, and a water outlet hole provided at the bottom of the housing. The first chamber, the water outlet, the water inlet, and the second chamber are in communication sequentially.

12 Claims, 7 Drawing Sheets

(58) Field of Classification Search
CPC ...... A47L 11/4088; A47L 13/20; A47L 13/22; A47L 13/23; A47L 13/24; A47L 13/26; A47L 13/42
USPC .......................................... 401/138, 270, 282
See application file for complete search history.

(56) References Cited

U.S. PATENT DOCUMENTS

| | | | | |
|---|---|---|---|---|
| 2005/0254882 | A1* | 11/2005 | Hofte | A47L 13/22 |
| | | | | 401/270 |
| 2017/0202421 | A1* | 7/2017 | Hwang | A47L 13/26 |
| 2017/0231455 | A1* | 8/2017 | Krebs | A47L 13/225 |
| | | | | 15/320 |

FOREIGN PATENT DOCUMENTS

| | | | |
|---|---|---|---|
| DE | 102016103943 A1 * | 9/2017 | |
| DE | 202016103320 U1 | 9/2017 | |
| DE | 202016107271 U1 | 3/2018 | |

OTHER PUBLICATIONS

Description of CN207613721U Espacenet Translation; The Water Outlet of a Cleaning Device with Controllable Water Tank; Yang, Kai; Jul. 17, 2018 (Year: 2018).*
International Search Report for PCTEP2019086593 dated Mar. 9, 2020, 2 pgs.

* cited by examiner

CLEANING HEAD FOR A FLOOR CLEANING EQUIPMENT

CROSS-REFERENCE TO RELATED APPLICATIONS

The present application is a national phase entry under 35 U.S.C. § 371 of International Application No. PCT/EP2019/086593 filed Dec. 20, 2019, which claims priority from Chinese Application Nos. 201910504309.7 and 201920874700.1, both filed on Jun. 12, 2019, all of which are incorporated herein by reference.

FIELD OF THE INVENTION

The present invention relates to the technical field of cleaning equipment, and in particular to a cleaning head for a floor cleaning equipment.

BACKGROUND OF THE INVENTION

In daily life, vacuum cleaners are generally used for sucking particulate matter such as dust on floors to be cleaned, and are particularly suitable for cleaning rough floors, for example, for cleaning indoor carpets, wooden floors, etc. For the cleaning of smooth floors, such as floor tiles and ceramic tiles, cleaning mops are generally used to wipe the smooth to floors with a wet mop cloth to remove stains from the surface of the smooth floors. Such a cleaning approach inevitably requires a user to replace the cleaning tool multiple times to realize the cleaning operation of the surface to be cleaned, which is cumbersome to operate.

The Chinese invention patent application with the publication number of CN108852185A discloses a "Water Tank and Automatic Sweeping Device." The water tank comprises a tank body and a gear adjusting member. A liquid outlet, a first adjusting port and a second adjusting port are formed in the tank body at intervals. When the gear adjusting member selectively seals the first adjusting port, and under the condition that the tank body stores liquid, a bubble cavity is formed in the second adjusting port. When the gear adjusting member selectively seals the second adjusting port, and under the condition that the tank body stores the liquid, continuous bubbles are formed at the first adjusting port. The water tank comprises a tank bottom and a tank cover connected with each other. A first water cavity and a second water cavity in communication with each other are formed between the tank bottom and the tank cover. The depth of the first water cavity is greater than that of the second water cavity. The liquid outlet, the first adjusting port, and the second adjusting port are provided on the tank bottom at intervals, with the first adjusting port directly communicating with the first water cavity and the second adjusting port directly communicating with the second water cavity. Because the first water cavity and the second water cavity are both closed chambers and communicate with each other, the first adjusting port puts the exterior and the first water cavity in communication, and the second adjusting port puts the exterior and the second water cavity in communication. When the first adjusting port is selectively closed while the second adjusting port is open, air enters the second water cavity in the form of bubbles under the effect of the atmospheric pressure. Since the water level in the second water cavity is lower, the pressure of the fluid overcome by the air bubbles is smaller, thus the bubbles enter the second water cavity more easily and in a larger quantity and the water output is larger. When the first adjusting port is open while the second adjusting port is closed, air enters the first water cavity in the form of bubbles under the effect of the atmospheric pressure. Since the water level in the first water cavity is higher than that in the second water cavity, the pressure of the fluid overcome by the air bubbles is greater, thus the bubbles enter the second water cavity with more difficulty and in a smaller quantity, and the water output is smaller.

It can be seen that, in the above-described structure, the two adjusting ports are both provided at the bottom of the water tank, and each adjusting port is located at a certain distance from the water level in the corresponding water cavity. In other words, each to adjusting port is lower than the water level in the corresponding water cavity in the water tank. Thus it is evitable that water in the water tank leaks from the open adjusting port, with exterior air entering from the liquid outlet, resulting in uncleanliness of the floor to be cleaned. If the second adjusting port is provided at a top wall of the second water cavity and the first adjusting port is provided at a top wall of the first water cavity, when the first adjusting port is closed while the second adjusting port is open, since the two water cavities are in communication with each other and the water level in the first water cavity is higher than that in the second water cavity, water in the second cavity will come out from the second adjusting port, wetting the exterior of the tank body, and even entering the inside of the floor sweeping robot, causing damage to the electric motor. In addition, if the water tank is provided with a venting hole and when the venting hole is in an open state, exterior air will only enter the water tank via the venting hole, while water comes out at both the open adjusting port and the liquid outlet. The above-described situation where water in the water supply tank leaks from the open adjusting port will still occur.

SUMMARY OF THE INVENTION

In order to solve the above-mentioned technical problems, an objective of the present invention is to provide a cleaning head for a floor cleaning equipment that provides a smoother water supply and a higher humidifying efficiency to the mop cloth.

In order to achieve the above-mentioned objective of the present invention, the present invention adopts the following technical solution:

A cleaning head for a floor cleaning equipment, comprising:
 a cleaning head body provided with at least one suction port at the bottom;
 a base plate used for mounting a mop cloth for cleaning;
 a water supply tank used for supplying water to the mop cloth, the water supply tank being mounted to the cleaning head body and located above the base plate, the water supply tank being provided with a venting hole that communicates with the exterior, a first chamber used for storing cleaning water being provided inside the water supply tank, and a water outlet being provided at the bottom of the water supply tank;
 a water distributor mounted to the base plate, the water distributor comprising a housing, a water inlet provided at the top of the housing, a second chamber formed inside the housing, and at least one water outlet provided at the bottom of the housing, the volume of the second chamber being smaller than that of the first chamber, the first chamber, the water outlet, the water inlet, the second chamber, and the water outlet being to in communication sequentially;

a communicating tube that puts the first chamber and the second chamber in communication, the communicating tube having a lower end opening in communication with the second chamber and an upper end opening extending into the first chamber and located in an upper portion of the first chamber.

In the above-mentioned technical solution, preferably, the base plate is integrally formed with the water supply tank and is detachably mounted to the cleaning head body.

In the above-mentioned technical solution, preferably, the base plate is fixedly mounted at the bottom of the cleaning head body, and the water supply tank is detachably mounted at the top of the cleaning head body.

In the above-mentioned technical solution, preferably, at least part of the communicating tube is integrally formed with the water supply tank and/or the base plate.

In the above-mentioned technical solution, preferably, the water distributor is detachably mounted to the base plate.

In the above-mentioned technical solution, preferably, at least part of the housing of the water distributor is integrally formed with the base plate.

In the above-mentioned technical solution, preferably, the lower end opening of the communicating tube is located on the base plate, and the top of the housing is provided with a connecting port connected with the lower end opening of the communicating tube.

In the above-mentioned technical solution, preferably, a sealing member is provided between the lower end opening of the communicating tube and the connecting port.

In the above-mentioned technical solution, preferably, the water supply tank is provided with a water filling port where a cover is mounted, the venting hole being provided on the cover.

In the above-mentioned technical solution, preferably, a water outlet valve is provided inside the water supply tank, the water outlet valve being mounted at the water outlet and used for opening and closing the water outlet, the water supply tank is also provided with an action member that is drivingly connected with the water outlet valve for a user to operate the water outlet valve from outside the water supply tank to open or close the water outlet.

In the above-mentioned technical solution, preferably, the water distributor comprises a to partition provided inside the second chamber and separating the second chamber into upper and lower portions, the partition being provided with a plurality of small holes that put the upper and lower portions of the second chamber in communication.

In the above-mentioned technical solution, preferably, the water distributor comprises an absorbent core provided at the water outlet, the absorbent core being partially exposed from the corresponding water outlet and being capable of guiding water flowing into the second chamber to the outside of the water distributor through the water outlet hole.

The present invention facilitates the timely evacuation of air inside the second chamber to the first chamber by providing the communicating tube that puts the first chamber and the second chamber in communication. The water inside the first chamber is more easily guided into the second chamber, therefore achieving a smoother supply of water inside the water supply tank to a mop cloth, and increasing the efficiency of humidifying the mop cloth. In addition, after the second chamber is filled with water for cleaning, the water level in the communicating tube is of the same height as that in the first chamber, and at least part of the communicating tube extending inside the first chamber, effectively preventing water inside the second chamber from overflowing to the outside of the water supply tank, maintaining the cleanness of floors to be cleaned.

wherein: 11. Cleaning head body; 111. Suction port;

12. Base plate; 121. Receiving groove;

13. Water supply tank; 131. First chamber; 132. Water outlet; 135: Water filling port; 136. Cover; 137. Mounting hole; 138. Venting hole;

14. Water distributor; 141. Housing; 1412. Upper cover; 1413. Lower cover; 1414. Positioning slot; 1415. Plot; 1416. Positioning pin; 1417. Connecting port; 142. Water inlet; 143. Second chamber; 144. Water outlet hole; 146. Partition; 1461. Small hole; 1462. First positioning hole; 1463. Through hole; 147. Absorbent core; 1471. Second positioning hole;

15. Water outlet valve; 151. Plug; 152. Spring; 153. Sealing ring;

16. Action member; 161. Rotation shaft;

17. Rotatory connector;

18. Suction passage;

19. Communicating tube; 191; Lower end opening; 192. Upper end opening; 193. Communicating channel.

DETAILED DESCRIPTION OF THE INVENTION

The technical contents, structural features, achieved objectives and effects of the present invention will be described in detail below with reference to embodiments and the accompanying drawings. The positional relationships of upper, lower, left, right, front and rear described in the present embodiments correspond to the respective positional relationships shown in FIG. 1, respectively.

The cleaning head of the present invention is mainly used on a floor cleaning equipment. The floor cleaning equipment is an equipment used for performing dust suction and/or to cleaning on a floor to be cleaned. It can be for example a wet-and-dry vacuum cleaner, or a floor scrubber.

Figure 1:
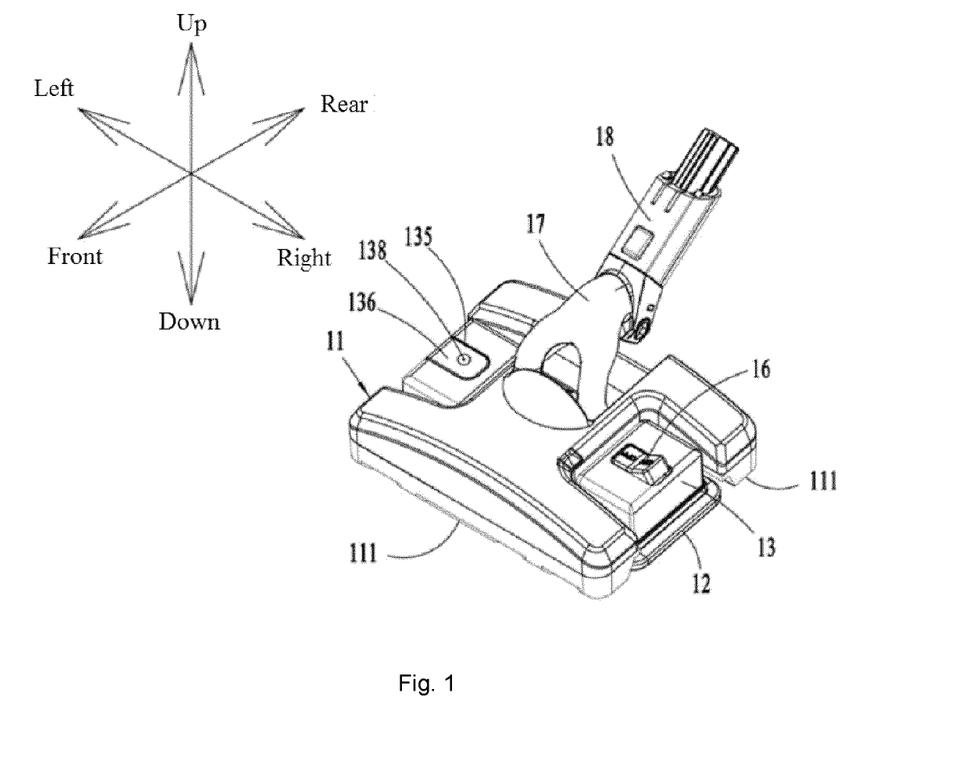
FIG. 1 is a schematic perspective view of a cleaning head for a floor cleaning equipment according to the present invention.
Figure 2:
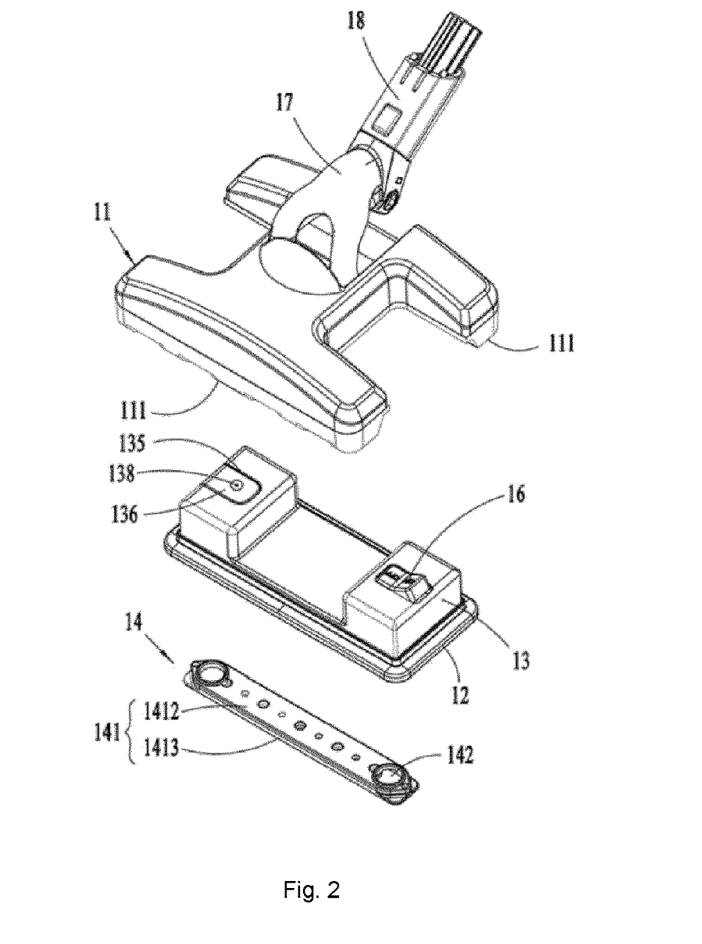
FIG. 2 is a schematic exploded view of a cleaning head for a floor cleaning equipment according to the present invention.

As shown in FIG. 1 and FIG. 2, a cleaning head comprises a cleaning head body 11, a base plate 12, a water supply tank 13, a water distributor 14, a rotary connector 17, and a suction passage 18.

The rotary connector 17 is connected to the cleaning head body 11. A part of the suction passage 18 is received inside the cleaning head body 11, and another part of it is provided on the rotary connector 17. The cleaning head body 11 is provided at the bottom with two suction ports 111 that are opposite each other in the front-rear direction. When the cleaning head is applied to be used on a floor cleaning machine, it is connected with a main body portion of the floor cleaning machine via the rotary connector 17, for example, connected with a suction unit of the floor cleaning machine by means of a hard tube or a hose. The suction passage 18 is capable of sucking in particulate matter such as dust on the floor to be cleaned through the suction ports 111 by means of a suction force of the suction unit. Of course, it is also possible to provide only one suction port 111 at a front portion of the cleaning head body 11. Thus, a function of first dusting and then mopping can be realized.

Figure 4:
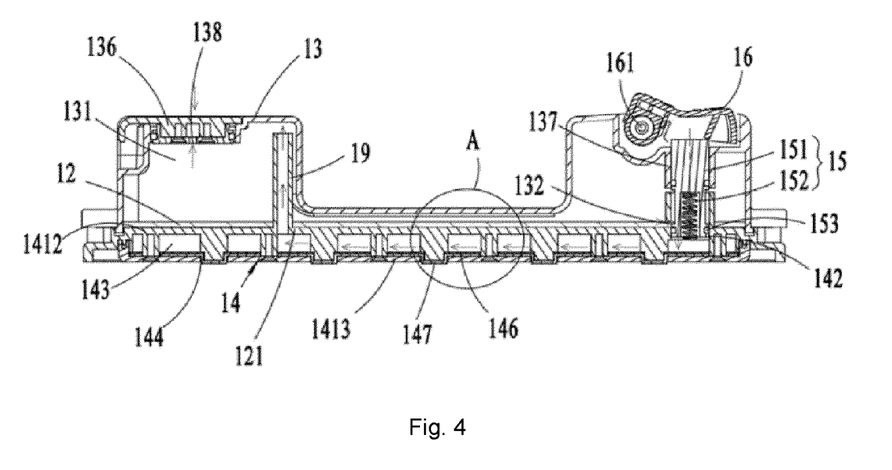
FIG. 4 is a first schematic cross-sectional view of a wet mopping device of the present invention (wherein the water outlet valve is in a closed state)

As shown in FIG. 2 and FIG. 4, the water supply tank 13 is fixedly mounted to the base plate 12. The two form a wet mopping device, with the base plate 12 used for holding a mop cloth for cleaning, and the water supply tank 13 used for supplying water to the mop cloth. A lower portion of the water supply tank 13 is of an opening structure. The base plate 12 is fixedly mounted at the lower portion of the water supply tank 13 and closes the opening of the lower portion of the water supply tank 13, so that the water supply tank 13 and the base plate 12 enclose a first chamber. Specifically, the base plate 12 and the water supply tank 13 are connected in a snap-fit manner by means of a connection portion constituted by a lower edge of a side wall plate of the water supply tank 13 and a connection groove circumferentially arranged at the base plate 12 and adapted to the lower edge of the side wall plate of the water supply tank 13. A waterproof sealing strip is provided in the connection groove. Of course, to facilitate the manufacturing by injection molding, the base plate 12 and the water supply tank 13 can also be integrally formed. Besides, the water supply tank 13 can also be a closed tank formed by a bottom wall and an outer shell. It is sufficient to provide the lower portion of the tank with an interfacing port to be connected with the base plate 12, so as to guide water inside the water supply tank 13 to the base plate to humidify the mop cloth.

The wet mopping device is detachably mounted to the cleaning head body 11. Specifically, to the water supply tank 122 has two tank portions that are opposite each other in the left-right direction, and a connection portion that connects the two tank portions. The connection portion is of a hollow structure and integrally formed with the two tank portions. The space between the two tank portions forms a snap groove. The cleaning head body 11 has a snap-in portion adapted to the snap groove. When the wet mopping device is mounted to the cleaning head body 11, the snap-in portion of the cleaning head body 11 is snapped in the snap groove of the wet mopping device, and the water supply tank 13 is located at the top of the cleaning head body 11. Of course, to facilitate the mounting of a mop cloth, the wet mopping device does not need to be completely detached from the cleaning head body 11. It is sufficient to fix the water supply tank 13 to the cleaning head body 11, and detachably provide the base plate 12 at the bottom of the water supply tank 13. In addition, the base plate 12 can also be fixed to or integrally formed with the lower portion of the cleaning head body 11, with the water supply tank 13 being detachably mounted at the top of the cleaning head body 11.

Figure 3:
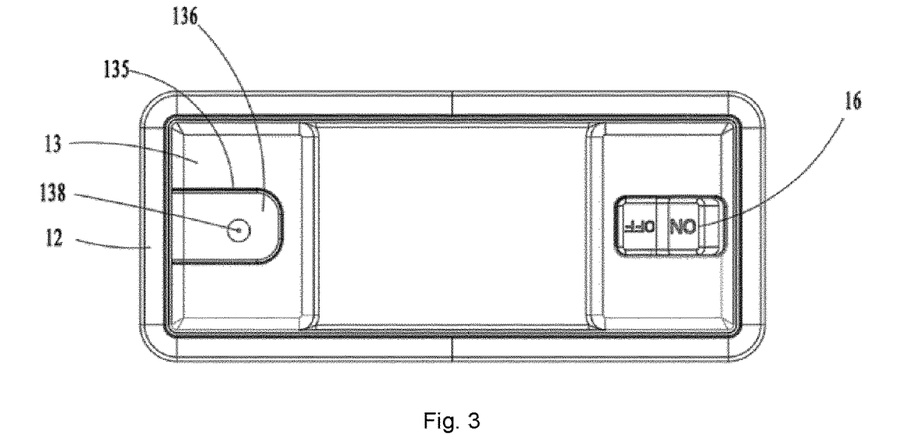
FIG. 3 is a schematic top view of a wet mopping device of the present invention.

As shown in FIG. 3, to facilitate the adding of cleaning water by a user, the water supply tank 13 is provided at the top with a water filling port 135 where a cover 136 is mounted. When the cover 136 covers the water filling port 135, the upper portion of the water supply tank 13 is of a closed structure, with the first chamber 131 inside it being sealed and communicating with the exterior only via a venting hole 138 arranged on the cover 136. In addition, the venting hole 138 may not be provided on the cover 136. To prevent water inside the water supply tank 13 from overflowing to the exterior, it is preferable to provide the venting hole 138 at the top of the water supply tank 13.

Figure 5:
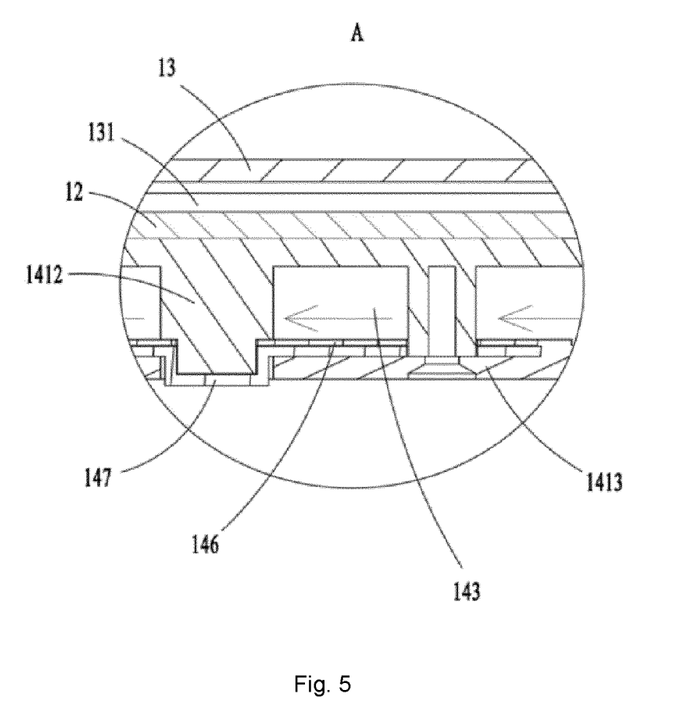
FIG. 5 is a partial and enlarged view of the part A in FIG. 4.

As shown in FIG. 4 and FIG. 5, the lower portion of the base plate 12 is provided with a receiving groove 121. The water distributor 14 is mounted inside the receiving groove 121. A bottom surface of the water distributor 14 is substantially flush with a bottom surface of the base plate 12. As a result, when a mop cloth is mounted to the base plate 12, the mop cloth will not be susceptible of being rugged and is adapted to be in tight engagement with the floor to be cleaned, improving the mopping result. The bottom of the water supply tank 13 is provided with a water outlet 132. The water outlet 132 is provided on the base plate 12, and the water outlet 132 communicates with the first chamber 131.

As shown in FIG. 8 to FIG. 11, the water distributor 14 comprises a housing 141, a partition 146, and absorbent cores 147. The housing 141 is formed by an upper cover 1412 and a lower cover 1413 fastened with each other. A second chamber 143 is enclosed between the upper cover 1412 and the lower cover 1413, and the volume of the second chamber 143 is smaller than that of the first chamber 131. The partition 146 and the absorbent cores 147 are respectively mounted inside the housing 141, with the partition 146 located above the absorbent cores 147. The partition 146 separates the second chamber 143 into to two (upper and lower) half portions. The upper half portion of the second chamber 143 constitutes a cavity for a water flow to enter, and the lower half portion of the second chamber 143 houses the absorbent cores 147. The absorbent cores 147 are made of a material with good absorbent property, for example, water-absorbent resin, cellulose, polyacrylamide, degreased cotton, sponge, silicone, etc.

In order to tightly fix the partition 146 and the absorbent cores 147 in the second chamber 143 after the upper cover 1412 and the lower cover 1413 being fastened with each other, the upper cover 1412 is provided, along the direction of its length, with a plurality of positioning slots 1414 and a plurality of plots 1415 extending downwards. The plurality of plots 1415 and the plurality of positioning slots 1414 are provided one adjacent to another. That is to say, one plot 1415 is provided between every two positioning slots 1414. The lower cover 1413 is provided, along the direction of its length, a plurality of water outlet holes 144 for inserting the plurality of plots 1415 and a plurality of positioning pins 1416 adapted to the plurality of positioning slots 1414. The plurality of water outlet holes 144 and the plurality of positioning pins 1416 are provided one adjacent to another. That is to say, one water outlet hole 144 is provided between every two positioning pins 1416. The partition 146 is provided, along the direction of its length, with first positioning holes 1462 for being traversed by the plurality of positioning pins 1416 and a plurality of through holes 1463 for being traversed by the plurality of plots 1415. The plurality of first positioning holes 1462 and the plurality of through holes 1463 are provided one adjacent with another. That is to say, one through hole 1463 is provided between every two first positioning holes 1462. The absorbent cores 147 are provided, along the direction of their length, with second positioning holes 1471 for being traversed by the plurality of positioning pins 1416. The partition 146 is further provided with a plurality of small vertical through holes 1461 for water to flow through the partition 146. Each small hole 1461 is integrally formed with the corresponding first positioning hole 1462.

When the absorbent cores 147 and the partition 146 are fitted in the housing 141, the positioning pins 1416 on the lower cover 1413 traverse, sequentially, the second positioning holes 1471 on the absorbent cores 147 and the first positioning holes 1462 on the partition 146, and finally are inserted inside the positioning slots 1414 on the upper cover 1412. At the same time, the plurality of plots 1415 on the upper cover 1412 traverse the plurality of through holes 1463 on the partition 146 and are inserted inside the plurality of water outlet holes 144 on the lower cover 1413, in the course of which, the part of the absorbent cores 147 other than the second positioning holes 1471 is tightly pressed inside the water outlet holes 144 by the positioning plots 1415 on the upper cover 1412, and is exposed outside the water outlet holes 144. In other words, the plurality of water outlet holes 144 are all located below the partition 146.

Figure 6:
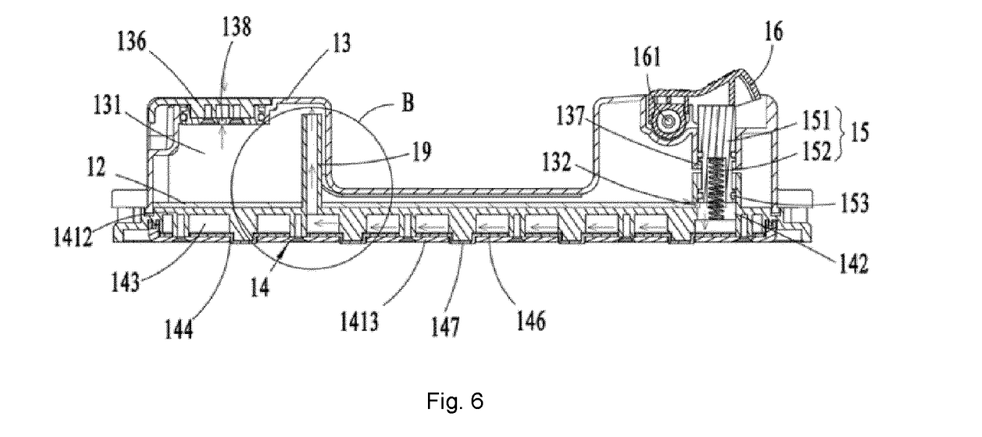
FIG. 6 is a second schematic cross-sectional view of a wet mopping device of the present invention (wherein the water outlet valve is in an open state)

The upper cover 1412 is provided with a water inlet 142 that communicates with the second chamber 143. With reference to FIG. 4 and FIG. 6, when the water distributor 14 is mounted at the lower portion of the base plate 12, the water inlet 142 and the water outlet 132 on the base plate 12 are in communication, and the water inlet 142 of the water distributor 14, the second chamber 143, and the plurality of water outlet holes 144 communicate with each other sequentially. The absorbent cores 147 are able to guide water flowing into the second chamber 143 to the outside of the housing 141 via the water outlet holes 144, i.e., to the mop cloth below it, so as to humidify the mop cloth.

Figure 7:
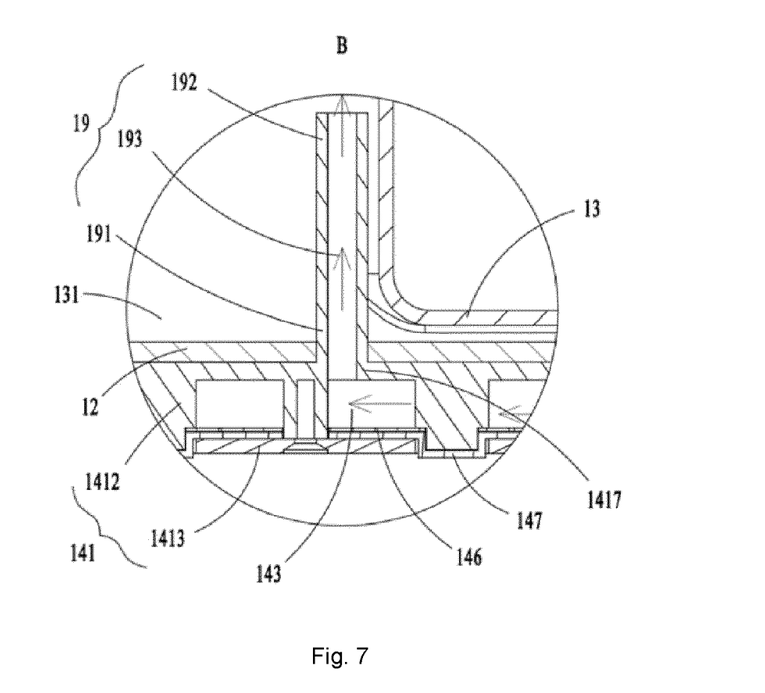
FIG. 7 is a partial and enlarged schematic view of the part B in FIG. 6.
Figure 8:
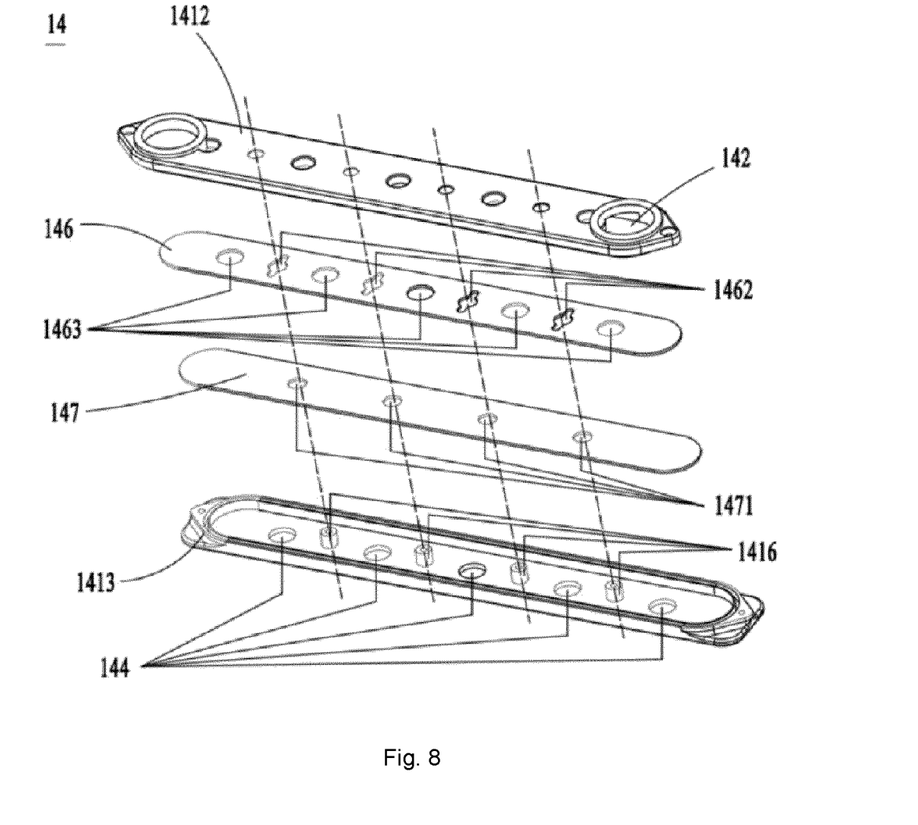
FIG. 8 is a schematic exploded view of a water distributor of the present invention.
Figure 9:
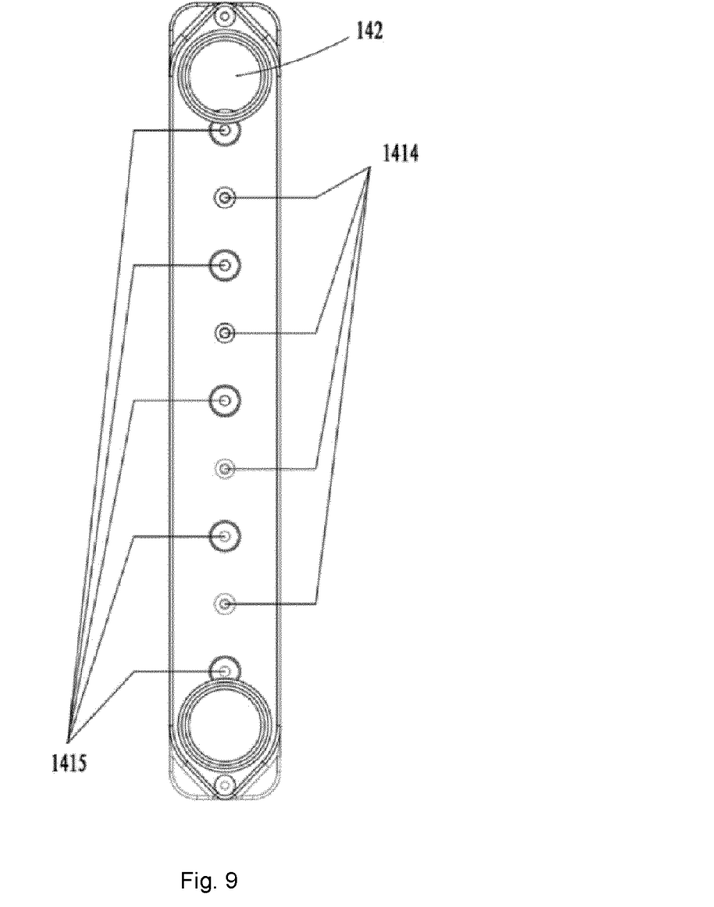
FIG. 9 is a schematic bottom view of a housing upper cover of a water distributor of the present invention.
Figure 10:
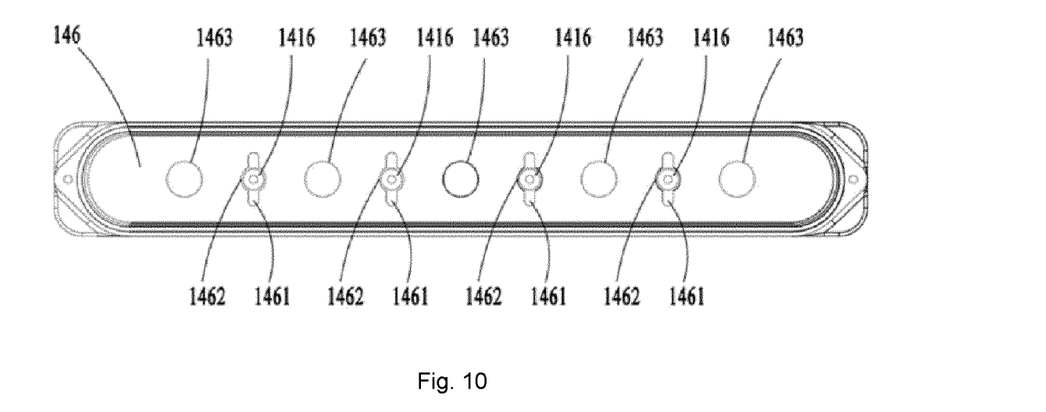
FIG. 10 is a schematic top view of the remaining part of a water distributor of the present invention after the housing upper cover is removed.
Figure 11:
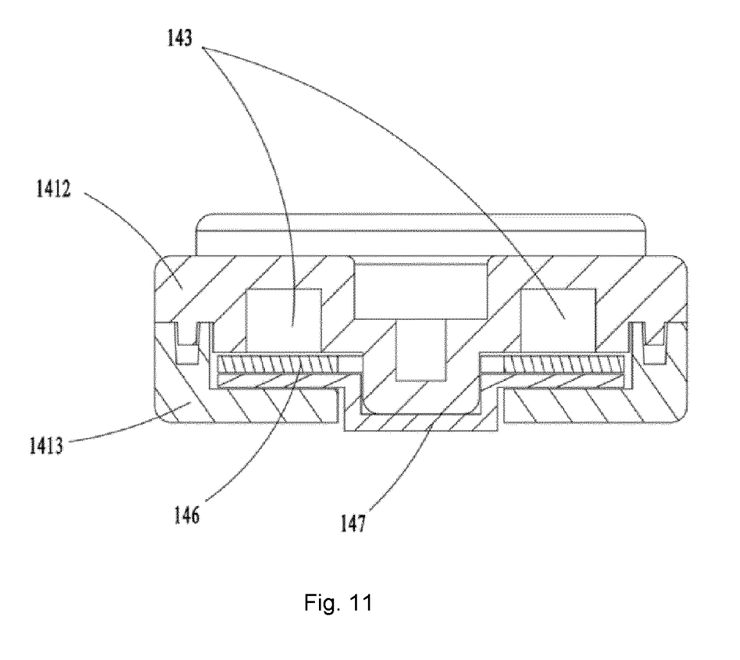
FIG. 11 is a schematic cross-sectional structural view of a water distributor of the present invention.

As the water outlet 132 is provided near one end of the base plate 12, some of the plurality of water outlet holes 144 are near the water outlet 132 while others are far from the water outlet 132. Water flowing into the second chamber 143 fills fast the side near the water outlet 132 and slowly the side far from the water outlet 132. To solve this problem, air stored in the second chamber 143 needs to be quickly evacuated to the first chamber 131, so that water inside the first chamber 131 quickly and smoothly fills the second chamber 143. A communicating tube 19 that puts the first chamber 131 and the second chamber 143 in communication is provided in the water supply tank 13. The communicating tube 19 extends at least partially in the first chamber 131. As shown in FIG. 6 and FIG. 7, its specific structure is: the communicating tube 19 has an upper end opening 192, a lower end opening 191, and a communicating channel 193 extending between the two openings. The lower end opening 191 of the communicating tube 19 is located on the base plate 12. The top of the housing 141 of the water distributor 14 is provided with a connecting port 1417 connected with the lower end opening 191 of the communicating tube 19. The lower end opening 191 of the communicating tube 19 is inserted inside the connecting port 1417. On this basis, in order to prevent the water supply tank 13 from leaking, it is preferable to provide a sealing member, for example, a sealing ring, between the lower end opening 191 of the communicating tube 19 and the connecting port 1417. To make air in the second chamber 143 quickly enter the first chamber 131, the upper end opening 191 of the communicating tube 19 extends into the first chamber 131, and preferably to near the inner top wall of the water supply tank 13. In other words, it is preferable that the upper end opening 192 of the communicating tube 19 is located higher than the maximum water level in the first chamber 131. Thus, when water inside the first chamber 131 enters the second chamber 143 via the water outlet 132, air inside the second chamber 143 is able to be evacuated into the first chamber 131 via the communicating tube 19, and water inside the first chamber 131 is able to quickly fill up the second chamber 143. Water inside the second chamber 143 is able to flow to the plurality of water outlet holes 144, improving the efficiency of humidifying the mop cloth. On this basis, to increase the fluidity of the water flowing inside the second chamber 143, it is preferable to design an upper surface of the partition 146 as an oblique face that inclines downward from near the water outlet 132 towards away from the water outlet 132. In addition, part of the communicating channel 193 of the communicating tube 19 can be located outside the water supply tank 13 and exposed to the exterior environment. The part of the communicating channel 193 exposed to the exterior environment can also be designed to be of transparent to facilitate observing the height of the water level in the water supply tank 13 so that the user may timely add or replace cleaning water.

Of course, to facilitate the manufacturing of the water supply tank 13 by injection molding, the communicating channel 193 can also be formed integrally at an inner wall face of the water supply tank 13. Of course, the communicating tube 19 can also be formed integrally with the base plate 12. In addition, the upper cover 1412 of the water distributor 14 can also be formed integrally with the base plate 12. The three of the upper cover 1412 of the water distributor 14, base plate 12, and the communicating tube 19 can be integrally formed.

To prevent water in the water supply tank 122 from continuously flowing into the second chamber 143 via the water outlet 132 after a user finishes a mopping operation, which results in an excessive water content on the mop cloth and thus leaving a large area of water stain on the floor to be cleaned, a water outlet valve 15 for opening and closing the water outlet 132 is mounted at the water outlet 132, as shown in FIG. 4 and FIG. 6. An action member 16, operable by a user and drivingly connected with the water outlet valve 15, is provided at an upper portion of the water supply tank 13. During use, by operating the action member 16, the user drives the water outlet valve 15 to perform an action so as to open or close the water outlet 132 at the bottom of the water supply tank 13.

Specifically, the water supply tank 13 is provided with a mounting hole 137. The water outlet valve 15 comprises a plug 151 and a spring 152 mounted inside the mounting hole 137. One end of the spring 152 is connected to the plug 151 and the other end of it is connected inside the mounting hole 137. The plug 151 is provided with a sealing ring 153 at its lower end. The action member 16 is a button member, one end of which is mounted to the water supply tank 13 by means of a rotation shaft 161, and the other end constitutes a trigger portion for a user to press or step on. The upper end of the plug 151 abuts against the button member. Of course, the action member 16 is not limited to the above-described button-type rotating member. It can also be a movable member. The structure of the water outlet valve 15 is not limited to the above-described plug 151 that moves in the vertical direction either. It can also be a cover plate that moves in the horizontal direction. For example, the movable member and the cover plate are fixedly connected. During use, by operating the movable member, the user drives the cover plate to move in the horizontal direction, so that the cover plate and the water outlet 132 are offset from each other or face each other, so as to open or close the water outlet 132.

As shown in FIG. 4, when the water outlet valve 15 is closed, water inside the first chamber 131 no longer flows into the second chamber 143, while water inside the second chamber 143 continues to flow to the plurality of water outlet holes 144 to humidify the mop cloth until it is drained.

As shown in FIG. 6, when the water outlet valve 15 is open, water inside the first chamber flows into the second chamber 143 again, while the second chamber 143 will be filled with water again, which flows to the plurality of water outlet holes 144 to humidify the mop cloth.

The above embodiments are merely illustrative of the technical concept and features of the present invention, and are intended to enable those skilled in the art to understand and thereby implement the contents of the present invention, and the scope of protection of the present invention cannot be limited thereto. Any equivalent modifications or embellishments made in accordance with the spirit of the present invention shall be included within the scope of protection of the present invention.

The invention claimed is:

1. A cleaning head for a floor cleaning equipment, comprising:
   a cleaning head body provided with at least one suction port at a bottom of the cleaning head body;
   a base plate used for mounting a mop cloth for cleaning;
   a water supply tank for supplying water to the mop cloth, the water supply tank being mounted to the cleaning head body and located above the base plate, wherein the water supply tank is provided with a venting hole that communicates with an exterior, a first chamber used for storing cleaning water being provided inside the water supply tank, and a water outlet provided at a bottom of the water supply tank;
   a water distributor mounted to the base plate, the water distributor comprising a housing, a water inlet provided at a top of the housing, a second chamber formed inside the housing, and at least one water outlet hole provided at a bottom of the housing, wherein a volume of the second chamber is smaller than that of the first chamber, wherein the first chamber, the water outlet, the water inlet, the second chamber, and the at least one water outlet are in communication sequentially;
   a communicating tube that puts the first chamber and the second chamber in communication, the communicating tube having a lower end opening in communication with the second chamber and an upper end opening extending into the first chamber and located in an upper portion of the first chamber above a maximum water line of the first chamber.

2. The cleaning head for a floor cleaning equipment according to claim 1, wherein the base plate is integrally formed with the water supply tank, and is detachably mounted to the cleaning head body.

3. The cleaning head for a floor cleaning equipment according to claim 1, wherein the base plate is fixedly mounted at the bottom of the cleaning head body, and the water supply tank is detachably mounted at a top of the cleaning head body.

4. The cleaning head for a floor cleaning equipment according to claim 1, wherein at least part of the communicating tube is integrally formed with the water supply tank and/or the base plate.

5. The cleaning head for a floor cleaning equipment according to claim 1, wherein the water distributor is detachably mounted to the base plate.

6. The cleaning head for a floor cleaning equipment according to claim 1, wherein at least part of the housing of the water distributor is integrally formed with the base plate.

7. The cleaning head for a floor cleaning equipment according to claim 1, wherein the lower end opening of the communicating tube is located on the base plate, and the top of the housing includes a connecting port connected with the lower end opening of the communicating tube.

8. The cleaning head for a floor cleaning equipment according to claim 7, comprising a sealing member located between the lower end opening of the communicating tube and the connecting port.

9. The cleaning head for a floor cleaning equipment according to claim 1, wherein the water supply tank includes a water filling port where a cover is mounted, the venting hole being provided on the cover.

10. The cleaning head for a floor cleaning equipment according to claim 1, comprising a water outlet valve inside the water supply tank, wherein the water outlet valve is mounted at the water outlet and used for opening and closing the water outlet, and the water supply tank is also provided with an action member that is drivingly connected with the water outlet valve for a user to operate the water outlet valve from outside the water supply tank to open or close the water outlet.

11. The cleaning head for a floor cleaning equipment according to claim 1, wherein the water distributor comprises a partition provided inside the second chamber that separates the second chamber into upper and lower portions, wherein the partition is provided a plurality of small holes that put the upper and lower portions of the second chamber in communication.

12. The cleaning head for a floor cleaning equipment according to claim 1, wherein the water distributor comprises an absorbent core that is provided at the at least one water outlet hole, is partially exposed from a corresponding water outlet hole, and is capable of guiding water flowing into the second chamber to an outside of the water distributor through the corresponding water outlet hole.

* * * * *